April 1, 1958

W. A. DUFFIELD 2,828,651

TRANSMISSION

Filed Aug. 30, 1954

Inventor
William A. Duffield
by Stevens, Davis, Miller & Mosher
his attorneys

Inventor
William A. Duffield
By
Stevens, Davis, Miller & Mosher
Attorneys

United States Patent Office 2,828,651
Patented Apr. 1, 1958

2,828,651

TRANSMISSION

William A. Duffield, Mimico, Ontario, Canada

Application August 30, 1954, Serial No. 452,782

Claims priority, application Canada September 4, 1953

15 Claims. (Cl. 74—730)

This invention relates to automatic variable speed transmissions which include a fluid drive unit.

In general, the object of this invention in its preferred embodiment is to provide a transmission which is relatively simple and inexpensive in construction, which is capable of being built utilizing conventional manufacturing facilities, and which combines a full range of automatic operation under full power with provisions for independent control by the operator to provide unusual flexibility of performance under a wide range of driving conditions. Safety features are also included to preclude operation in such a manner that damage would be caused to the transmission, and to avoid accidental operation of the controls to produce unintentional movement of the vehicle.

As will be apparent from the description of the preferred embodiment of this invention, several inventive features are combined to achieve the foregoing general objective. In accordance with one inventive feature the drive from the input to the transmission is transmitted, during the torque conversion stages of the transmission, through a countershaft reduction gearing system to the main shaft. An automatically controlled clutch couples the input of the transmission to the main shaft for direct drive. Means are provided to enable the main shaft to overrun the countershaft reduction gearing system during this direct drive stage. This provision for overrunning by the main shaft avoids the usual clutches for connecting and disconnecting the reduction gearing during various stages of operation. Also this provision for overrunning makes it practical for a countershaft reduction gearing system to be used in place of the planetary systems usually employed in automatic transmissions. The countershaft reduction gearing system is less expensive and less liable to develop mechanical defects than planetary systems. The use of a countershaft gearing system has the further advantage that a fully effective neutral postion of the gearing system can readily be provided. In addition, the reduction gearing will normally be continuously rotating during direct drive and will be immediately available for use upon a changedown of the transmission.

A further inventive feature lies in a special provision for engine braking and push starting which is included in combination with the overrunning provision referred to above. It will be appreciated that, although engine braking will be automatically achieved where there is a direct drive connection between the input and the main shaft, the reduction gearing will not exercise an engine braking effect due to the provision for overrunning of the reduction gearing by the main shaft. It is therefore proposed that an engine braking and push starting system be included which can be engaged at will by the operator to give a drive connection between the runner of the torque converter and the main shaft. A reduction ratio can be selected by the designer of the transmission for this engine braking system which is different from the reduction ratio of the reduction gearing system used during automatic operation. This feature enables the operator to obtain engine braking at a low gear ratio where desired, for example, in travelling down a steep gradient, but enables low gear ratio engine braking to be dispensed with when unnecessary. In addition, the provision for engine braking enables a simplified mechanism to be employed for rendering the reduction gearing inoperative to drive the main shaft during direct drive. The engine braking system can be engaged in case of battery failure to enable the engine to be push started.

A further inventive feature resides in the simple type of reverse gear provided in a transmission in accordance with the preferred embodiment of this invention when considered in combination with the proposed reduction gear and direct drive system. Means such as a sliding gear are provided having a neutral position, a position in which said means provides a link in the reduction gear system and a position in which said means is disposed in a position in which it drivably connects the runner of the converter to the main shaft to cause rotation of the main shaft in a direction opposite to that of the runner. A release clutch enables said means to be engaged and disengaged alternatively with the reduction gear system or with the reverse gear system. The engine braking system preferably utilizes the input part of the same chains of gearing as the reduction gear system used during automatic operation and the reverse gear system and the same release clutch is therefore used for the engagement and disengagement of the engine braking system.

A transmission in accordance with the preferred embodiment of this invention is unique among automatic transmissions in that it has a fully effective neutral position. When the sliding gear referred to in the preceding paragraph is in neutral position the reduction system is completely disconnected from the output shaft with the consequence that there is no tendency for the vehicle to creep when in neutral position. This makes it unnecessary to provide a parking lock. The parking lock included in most automatic transmissions presents an added complexity and there is the danger of it being accidentally released or of it failing to act allowing the vehicle to move forward.

Another inventive feature lies in the means provided for controlling the automatic engagement of a clutch coupling the input of the transmission to the main transmission shaft for direct drive. This coupling is preferably a direct mechanical connection to give the best operating economy, but an alternative is to dispose the automatically actuated clutch so that it acts to connect the main transmission shaft to the runner to give fluid drive throughout the whole range of vehicle operation. A speed responsive centrifugal governor causes the automatically actuated clutch to become engaged at predetermined speeds for direct drive. The speed at which the governor acts is preferably varied according to the throttle position. Means are provided for disconnecting the governor from the automatically actuated clutch except when the transmission is arranged for automatic forward movement. This prevents any possibility of a direct forward drive connection being made while the transmission is in reverse. Also the sliding gear is placed in a neutral position thus disconnecting the governor during engine braking to avoid the possibility of a simultaneous direct drive connection and a drive connection at a reduced ratio between the input and the main transmission shaft. Additional means are provided to enable the governor to be disconnected from the automatically actuated clutch at the will of the operator to enable the operator to change the transmission from direct drive to a lower ratio under conditions which normally would call for direct drive. This is particularly advantageous for winter driving.

Other inventive features reside in the use of engine oil pressure to operate the hydraulically actuated clutch and also to keep the converter fully charged.

Further inventive features will be apparent from the detailed description which follows and from the appended claims.

In the drawings which illustrate the preferred embodiment of this invention

Figure 1:
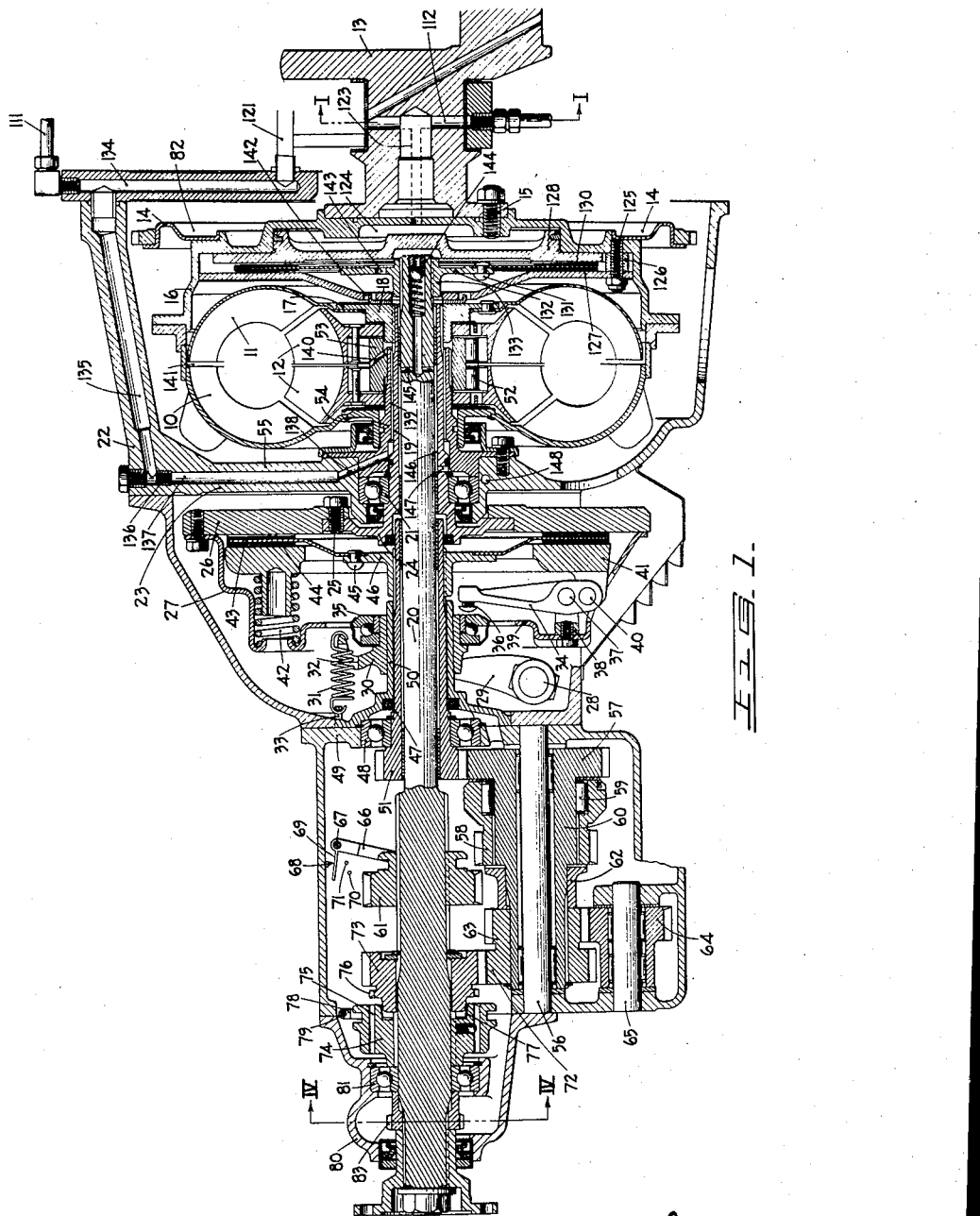
Figure 1 is a sectional elevation view of the preferred embodiment of this invention.

Reference will now be made to the embodiment illustrated in Figures 1 to 4. Figure 1 shows a fluid torque converter of the converter-fluid coupling type comprising an impeller 10, a turbine or runner 11 driven by the impeller, and reaction members 12. The torque converter functions as such as long as the runner turns at a comparatively slow speed. When the runner has attained the speed at which output torque drops below the input torque, torque conversion ceases and the unit starts to function as a fluid coupling. The drive to impeller 10 passes from engine crankshaft 13 which is the input member of the transmission, through flywheel 14, which is joined to crankshaft 13 by bolts 15 and through converter casing 16. Runner 11 is mounted on flange 17 of splined hub 18. Hub 18 is splined to sleeve 19 which encircles the main drive shaft 20 of the transmission. Sleeve 19 is carried by bearing 21 which is mounted in the main casing of the transmission 22 by web 23. A flange 24 forming part of sleeve 19 is joined by bolts 25 to the back plate 26 of a release clutch indicated generally by the numeral 27 and which is illustrated as being a conventional dry single plate mechanically operated clutch. Other types of clutch may be substituted and the clutch can be operated mechanically, hydraulically, by vacuum or any other suitable means.

The release clutch illustrated comprises a shaft 28 carrying lever 29. Shaft 28 is rotated clockwise with respect to Figure 1 to disengage the clutch. This moves sleeve 30 to the right against the influence of tension spring 31 connected between spur 32 on sleeve 30 and hook 33 on casing 22. The movement of sleeve 30 transmits thrust to release levers 34 through thrust bearing 35 and adjustment screw 36. Levers 34 are pivotally mounted by pins 37 on yokes 38 which are joined to cover plate 39. Pins 40 connect the outer ends of release levers 34 to pressure plate 41. Accordingly, clockwise rotation of levers 34 causes pressure plate 41 to be withdrawn against the pressure of compression springs 42 to free clutch disc 43. Clutch disc 43 has friction elements 44 on each surface and is joined by rivets 45 to flanged hub 46 which is splined to sleeve shaft 47. Sleeve shaft 47 is mounted in bearing 48; this bearing is carried by web 49. Sleeve 50 is joined to casing 22 and is interposed between sleeve 30 and sleeve shaft 47. When release clutch 27 is engaged, the drive from the runner 11 of the torque converter will be transmitted through sleeve shaft 47 to the input member 51 of the reduction gearing system. Gear wheel 51 also serves as the input member of the reverse gear system and the engine braking system.

Reaction members 12 are carried by one way brakes 52 on hub 53 which is splined to a short sleeve 54. One way brakes 52 prevent reaction members 12 from rotating backwards but permit forward rotation of the reaction members when torque conversion ceases, to permit the unit to function as a fluid coupling. The reaction of members 12 is absorbed in the casing 22 of the transmission through sleeve 54 and web 55.

Considering now the reduction gearing system, a countershaft 56 carries a countershaft reduction gear wheel 57 which meshes with input pinion 51. A reduction gear wheel 58 is mounted by one way clutch 59 on a lateral extension 60 of the hub of gear wheel 57. For forward rotation at a reduction ratio sliding gear wheel 61 which is splined to main shaft 20 meshes with gear wheel 58. One way clutch 59 is adapted to permit main transmission shaft 20 to overrun the reduction gear system to enable the transmission to be placed in direct drive without first declutching the reduction gear system. A spacing member 62 separates reduction gear 58 from countershaft reverse gear wheel 63 to provide for a neutral position of sliding gear 61.

Countershaft reverse gear wheel 63 meshes with reverse pinion 64 to change the direction of rotation. Pinion 64 is mounted on shaft 65 and is in a position in which the pinion is engageable with sliding gear 61 in one position of the sliding gear. (In Figure 1 the position of pinion 64 has been rotated for convenience of illustration.) It will be appreciated that when the reverse gear system is engaged main transmission shaft 20 will rotate in a direction opposite to that of runner 11.

Lever 66 mounted on shaft 67 provides for the adjustment of the position of sliding gear 61. Each time this sliding gear is to be engaged or disengaged, release clutch 27 will be freed to disconnect the converter from the reduction and reverse gearing systems. The position of shaft 67 controls the opening and closing of a switch 68 in such a manner that switch 68 will be closed when sliding gear 61 is engaged with the forward reduction gear system but will be open when the sliding gear wheel is in a neutral position or is in engagement with the reverse gear system. This may be achieved by providing contact bar 69 which bridges contacts 70 and 71 when sliding gear wheel 61 is in engagement with reduction gear wheel 58.

The engine braking system includes an engine braking gear wheel 72 splined to extension 60 and engaging a gear wheel 73 which idles on shaft 20 when the engine braking system is disengaged. A hub 74 is splined to shaft 20 to permit sliding movement and carries teeth 75 which are engageable with dog clutch member 76 on gear wheel 73 to affix gear wheel 73 to shaft 20. A synchronizer 77 facilitates the engagement of dog clutch member 76, and release clutch 27 should be disengaged for the connection or disconnection of the dog clutch. Lever arm 78 mounted on shaft 79 controls the position of hub 74. The engine braking system is thus engageable to couple the main transmission shaft 20 to runer 11 through gear wheels 73, 72, 57 and 51 and shafts 47 and 19. As gear wheels 72 and 73 are used only for engine braking the designer of the transmission can select an appropriate reduction ratio for the engine braking system which need not be the same as the reduction ratio of the reduction gearing system.

Figure 6:
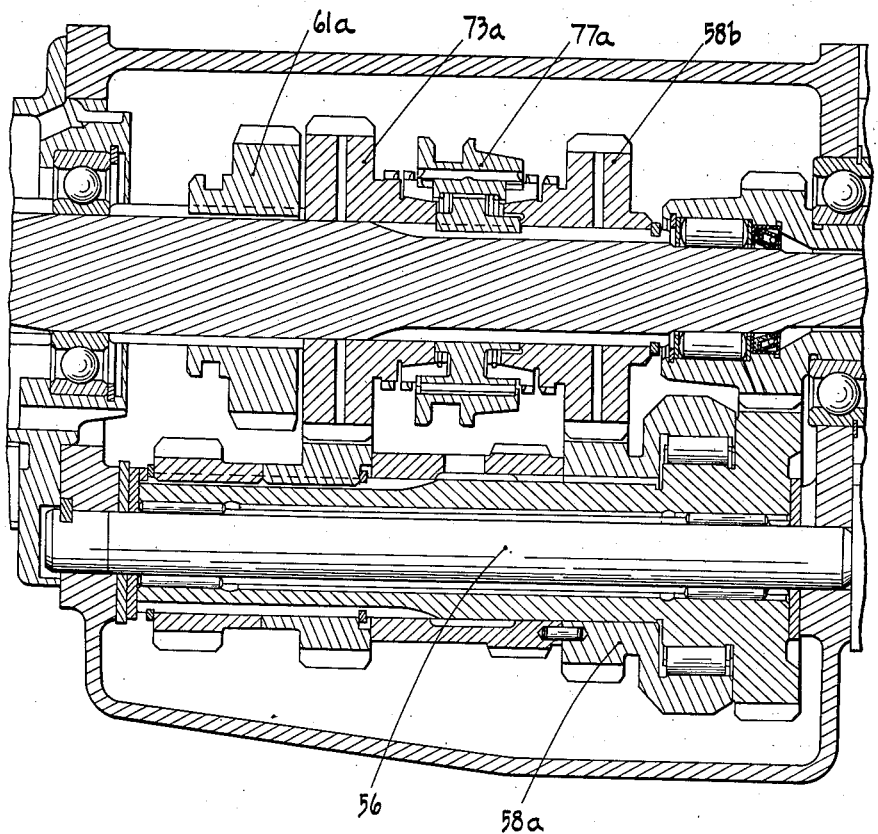
Figure 6 is a detailed sectional view of part of the gear box illustration a modified construction.

An an alternative to the gear box construction previously described, the gear box can be rearranged as shown in Figure 6 so that the synchronizer 77a is a double unit which can be engaged either with gear 73a of the emergency braking system, or with a gear 58b additional to those shown mounted on the main transmission shaft 20 and constantly meshing with gear wheel 58a of the forward reduction gearing system. For this purpose synchronizer 77a will be re-located between gear 73a and the gear 58b meshing with gear wheel 58. Sliding gear 61a will be used only to engage the reverse pinion 64 of the reverse gearing system and will be re-located to the rear side of gear 73a.

Figure 4:
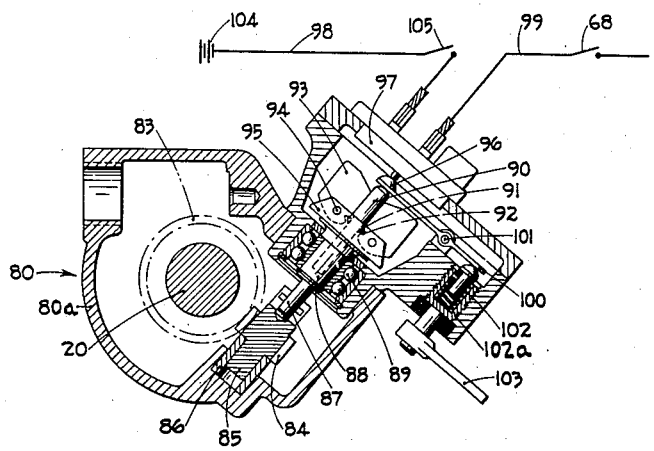
Figure 4 is a section view on the line IV—IV of Figure 1.
Figure 4A:
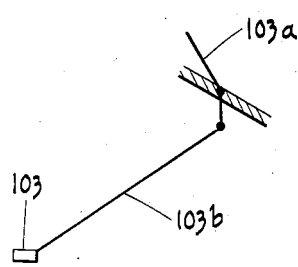
Figure 4a is a diagrammatic view showing the actuation of the adjustment lever for the governor.

A centrifugal speed responsive governor 80, shown in detail in Figure 4 is mounted adjacent to the rear bearing 81 of the transmission and is adapted automatically to control the engagement and disengagement of the hydraulically actuated clutch, indicated generally by the numeral 82 which couples the main transmission shaft 20 to the input member 13 for direct drive. The centrifugal speed responsive governor is shown in Figure 4 and comprises a casing 80a surrounding main transmission shaft 20, a gear wheel 83 splined to shaft 20 and driving governor input gear wheel 84 which is mounted by stub shaft 85 in bushing 86. Shaft 87 which is connected as an extension of shaft 85 carries sleeve 88 journalled within ball bearings 89. Rod 90 is telescopically received by sleeve 88 and carries lugs 91 which engage slots 92 in governor weights 93. Governor weights 93 are eccentrically mounted by pins 94 in carrier plates 95 which are joined to sleeve 88. Outward swinging movement of weights 93 under the influence of centrifugal force causes rod 90 to be extended from sleeve 88 to cause an electrical connection to be made by lever 96 which acts on a conventional switch 97, thus completing an electrical circuit between lines 98 and 99. Contact 96 is carried by a lever 100 pivoted on pin 101 and acted upon at one end by rod 90 and at the other end by compression spring 102. Compression spring 102 which causes rod 90 to be retracted when the centrifugal force of weights 93 diminishes is adjusted by adjustment lever 103. Adjustment lever 103 is controlled by the throttle position so that with an open throttle the governor will effect a change up to direct drive at a higher speed than with a lighter throttle. This is illustrated diagrammatically in Figure 4a, in which depression of throttle 103a causes any suitable connection, such as connecting link 103b, to be tensioned, moving adjustment lever 103 towards the throttle to tighten plug 102a, thus increasing the compression exerted by spring 102.

Figure 2:
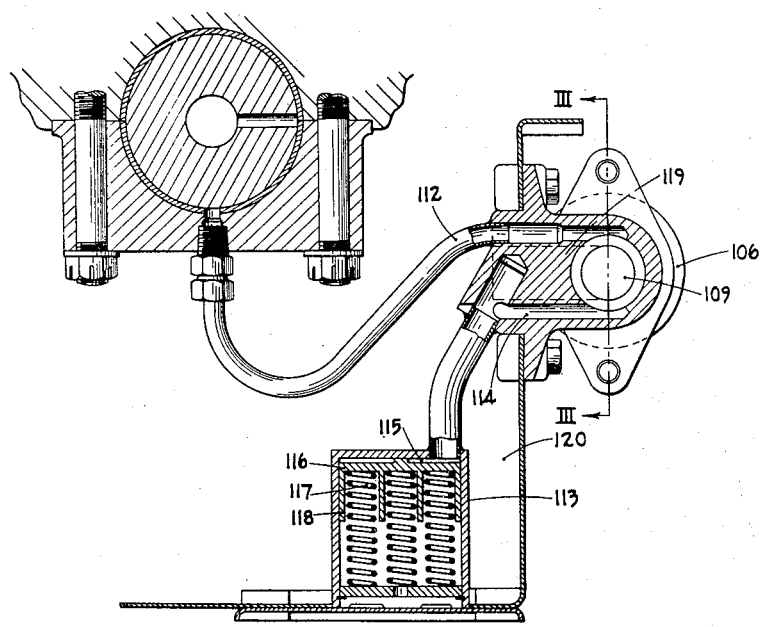
Figure 2 is a section view on the line I—I of Figure 1.
Figure 3:
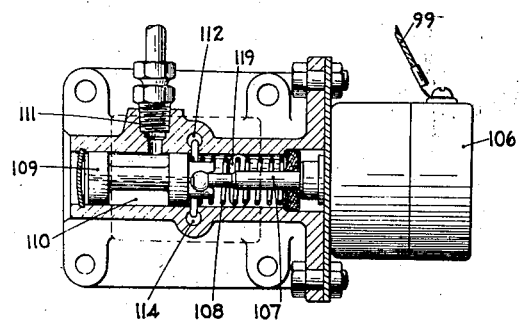
Figure 3 is a section view on the line III—III of Figure 2.

The completion of an electrical circuit from battery 104 through lines 98 and 99, if switches 68 and 105 are closed, energizes solenoid 106. As has already been explained switch 68 is closed only when sliding gear wheel 61 is positioned in engagement with reduction gear 58, and is open when sliding gear wheel 61 is in its neutral position or in engagement with the reverse gearing system. Switch 105 can be manually opened by the operator to make governor 80 ineffective to engage clutch 82. The energization of solenoid 106, as shown in Figures 2 and 3, causes rod 107 to be retracted against the influence of spring 108. This movement of rod 107 moves the piston 109 of piston valve 110 to permit oil to flow from passage 111 to passage 112. When oil initially starts to flow from pipe 111 to passage 112 modulator 113 acts to provide a smooth and surge free rise in pressure in passage 112. Oil flows through passage 114 into modulator 113 at the same time as it is supplied to passage 112. Modulator 113 has an oil receiving chamber 115 containing a piston 116 and a battery of compression springs 117 opposing downward movement of piston 116. The movement of piston 116 is limited by stop members 118. Modulator 113 will absorb part of the oil pressure and will result in a continuous increase in the oil pressure due to the force exerted by springs 117 being linearly related to the extent to which these springs are compressed. When solenoid 106 is deenergized piston 109 will be released to permit oil to flow both from passage 112 and modulator passage 114 through passage 119 into engine oil sump 120. Thus the modulator will act only when clutch 82 is being engaged and not during its disengagement. Oil for the operation of clutch 82 is taken at full engine oil pressure from engine oil gallery 121 by pipe 111, through valve 110, through passage 112 and passage 123, axially bored in crankshaft 13, to clutch cylinder 124. The clutch cylinder 124 of clutch 82 is formed within flywheel 14. Studs 125 fitted with spacers 126 secure back plate 127 of the clutch to the flywheel or clutch cylinder 124. Back plate 127 rotates freely on hub 133. Pressure plate 128 engages clutch disc 130 when oil is supplied to clutch cylinder 124. Clutch disc 130 is mounted by rivets 131 on a flange 132 of a hub 133 which is splined to main transmission shaft 20. Thus engagement of clutch 82 causes the input to be transmitted by a direct mechanical route from shaft 13 to shaft 20.

Oil from the torque converter is taken from the engine oil gallery 121 through passages 134 and 135 in transmission casing 22, through a restriction nozzle or diaphragm 136 which restricts the flow to the converter. The oil then passes through passage 137 in web 23 and through passage 138 to gallery 139 from whence it is fed to the torque converter by passage 140 which leads to the space between runner member 12. A suitable oil pressure for the converter is about 20 p. s. i. Excess oil pressure is released at 141 and passes outside the runner casing, through passage 142 and 143 to exert a back pressure on clutch cylinder 128 to restore clutch cylinder 128 to a disengaged position when the full oil pressure in chamber 124 is released. The pressure of the converter oil is controlled by ball valve 144. Excess oil released by valve 144 passes through ports 145 to gallery 146 through ports 147 to lubricate bearing 21, and from thence to drain 148 which leads to the crank case.

Figure 5:
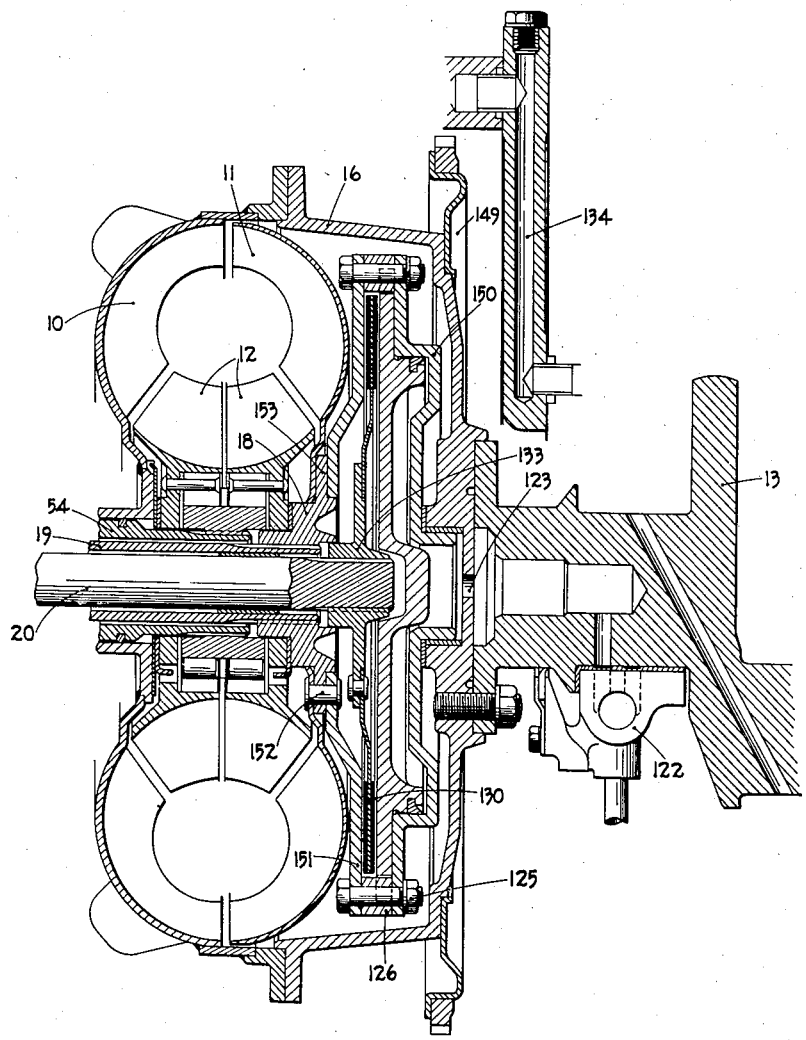
Figure 5 is a partial sectional view illustrating a different embodiment of this invention.

The embodiment illustrated in Figure 5 is similar to that shown in Figures 1 to 4 inclusive except that instead of forming the clutch cylinder for the hydraulically actuated clutch as part of the flywheel a separate flywheel 149 and clutch cylinder 150 are provided. Flywheel 149 is mounted on the converter casing 16 and on the crankshaft 13. Clutch cylinder 150 rotates independently of flywheel 149. Backing plate 151 is joined by rivets 152 to flange 153 of the hub 18 carrying runner 11. Accordingly engagement of the hydraulically actuated clutch of Figure 6 couples the input member 13 to transmission shaft 20 through the torque converter unit, which will be functioning as a fluid coupling during the direct drive stage. Fluid drive is therefore attained at all times.

The operation of the transmission has been in the main part described above in conjunction with the description of the components of the transmission but the overall operation of the transmission will be briefly summarized here. When the transmission is started the drive will be transmitted from input 13 through impeller 10 and runner 11 with the hydraulic drive unit functioning as a torque converter and reaction member 12 being stationary. The drive passes along shaft 19 through release clutch 27 and through the reduction gearing to the main shaft of the transmission. When the load recreases the hydraulic drive unit will commence to function as a fluid coupling with reaction members 12 running forwardly. Reduction or torque conversion will then be only attained through the reduction gearing system. Centrifugal governor 80 will act at a speed dependent on the throttle position automatically to engage clutch 82 to create a direct mechanical connection between input 13 and shaft 20 in Figures 1 to 4 and to couple runner 11 to shaft 20 in Figure 5. One way brake 59 will permit shaft 20 to overrun the reduction gearing system. The transmission will then be in direct drive. Normally in changing down the sequence of stages will be the converse of the foregoing.

When the operator wishes to change down from direct drive under conditions normally calling for direct drive he will open switch 105. This causes clutch 82 to be released and the drive will again be transmitted through the automatic reduction gearing system.

To reverse, release clutch 27 is disengaged and sliding gear 61 is moved into engagement with the reverse gearing system.

To apply engine braking, sliding gear 61 is brought to its neutral position, opening switch 68 to make governor 80 inoperative, release clutch 27 is disengaged and shaft 79 turned to bring the engine braking system into operation.

It will be clear from the foregoing that a transmission in accordance with the preferred embodiment of this invention has the following stages of operation:

(1) Torque conversion both in the hydraulic drive unit and the forward reduction gear set. The torque conversion in the hydraulic unit is continuously variable.

(2) Torque conversion only in the forward reduction gear set with the hydraulic drive unit acting as a fluid coupling. This stage will depend on the operation of the governor. The governor can however be overruled by the operator.

(3) Direct drive.

(4) Engine braking or push starting at a reduction ratio which may be different from that of the forward reduction gear set used during automatic operation.

(5) A fully effective and positive neutral position in which the engine is completely disconnected from the drive line.

It will be apparent from the foregoing that a transmission in accordance with the preferred embodiment of this invention combines simplicity and economy with flexibility of performance.

I claim:

1. A hydraulic transmission comprising an input shaft, a main transmission shaft, an automatically operated clutch for coupling said input shaft to the main transmission shaft for direct drive, a turbine shaft, a fluid torque converter for transmissing torque from said input shaft to said turbine shaft, an input pinion, a release clutch coupling the turbine shaft to said input pinion, a countershaft reduction gear system driven by said input pinion, means engageable for drivably connecting the output of said reduction gear system with the main transmission shaft, means permitting the main transmission shaft to overrun said reduction gear system, a reverse gear system driven by said input pinion, means engageable for drivably connecting the output of said reverse gear system with the main transmission shaft to drive said transmission shaft in a direction opposite to the direction of rotation of said input pinion, an engine braking system engageable for drivably connecting the main transmission shaft to said input pinion, a governor operably connected to the main transmission shaft and to said automatically operated clutch adapted to cause said automatically operated clutch to engage under predetermined conditions, means to render said governor ineffective except when the output of the reduction gear system is connected with the main transmission shaft, and additional means to render said governor ineffective adapted to enable the automatically operated clutch to be disengaged under conditions normally calling for direct drive.

2. A hydraulic transmission as in claim 1 in which said automatically operated clutch acts to effect a direct mechanical connection between the input shaft and the main transmission shaft.

3. A hydraulic transmission as in claim 1 in which the fluid torque converter is of the torque converter-fluid coupling type.

4. A hydraulic transmission comprising an input shaft, a main transmission shaft, an automatically operated clutch for coupling said input shaft to the main transmission shaft, a turbine shaft, a fluid torque converter for transmissing torque from said input shaft to said turbine shaft, an input pinion, a release clutch coupling the turbine shaft to said input pinion, a countershaft reduction gear system driven by said input pinion, means engageable for drivably connecting the output of said reduction gear system with the main transmission shaft, means permitting the main transmission shaft to overrun said reduction gear system, a reverse gear system driven by said input pinion, means engageable for drivably connecting the output of said reverse gear system with the main transmission shaft to drive said transmission shaft in a direction opposite to the direction of rotation of said input pinion, a governor operably connected to the main transmission shaft and to said automatically operated clutch adapted to cause said automatically operated clutch to engage under predetermined conditions, means to render said governor ineffective except when the output of the reduction gear system is connected with the main transmission shaft, and additional means to render said governor ineffective adapted to enable the automatically operated clutch to be disengaged under conditions normally calling for direct drive.

5. A hydraulic transmission comprising an input shaft, a main transmission shaft, an automatically operated clutch for coupling said input shaft to the main transmission shaft, a turbine shaft, a fluid torque converter for transmissing torque from said input shaft to said turbine shaft, an input pinion, a reduction gear system including a countershaft and driven by said input pinion, means engageable for drivably connecting the output of said reduction gear system with the main transmission shaft, means permitting the main transmission shaft to overrun said reduction gear system, an engine braking system engageable for drivably connecting the main transmission shaft to said input pinion, a governor operably connected to the main transmission shaft and to said automatically operated clutch adapted to cause said automatically operated clutch to engage under predetermined conditions, and means to render said governor ineffective except when the output of the reduction gear system is connected with the main transmission shaft.

6. A hydraulic transmission comprising an input shaft, a main transmission shaft, an automatically operated clutch for coupling said input shaft to the main transmission shaft, a turbine shaft, a fluid torque converted for transmitting torque from said input shaft to said turbine shaft, an input pinion driven by said turbine shaft, a reduction gear system including a countershaft and driven by said input pinion, means for drivably connecting the output of said reduction gear system with the main transmission shaft, means permitting the main transmission shaft to overrun said reduction gear system, an engine braking system engaged for drivably connecting the main transmission shaft to said input pinion, a governor operably connected to the main transmission shaft and to said automatically operated clutch adapted to cause said automatically operated clutch to engage under predetermined conditions.

7. A hydraulic transmission comprising an input shaft a main transmission shaft, an automatically operated clutch for coupling said input shaft to the main transmission shaft for direct drive, a turbine shaft, a fluid torque converter for transmitting torque from said input shaft to said turbine shaft, an input pinion driven by said turbine shaft, a reduction gear system including a countershaft and driven by said input pinion, means for drivably connecting the output of said reduction gear system with the main transmission shaft, means permitting the main transmission shaft to overrun said reduction gear system, a governor operably connected to and controlled by the speed of said main transmission shaft and operably connected to said automatically operated clutch to cause said automatically operated clutch to engage under a predetermined speed of said main transmission shaft, and means to render said governor ineffective adapted to enable the automatically operated clutch to be disengaged at speeds of the main transmission shaft normally calling for direct drive.

8. A hydraulic transmission comprising an input shaft a main transmission shaft, an automatically operated clutch for coupling said input shaft to the main transmission shaft, an impeller driven by said input shaft, a runner driven by the impeller, a shaft carrying said runner, a reaction member mounted on a one way clutch to permit the reaction member to run forward when torque conversion ceases, an input pinion, a release clutch coupling the runner shaft to the input pinion, a countershaft, means for engaging and disengaging said release clutch, a reduction gear system comprising a reduction gear meshing with said input pinion mounted on said countershaft and connected with a second gear mounted on the countershaft and a sliding gear splined to the main transmission shaft and engageable with said second gear; a one way clutch connecting said second gear to the countershaft to permit the main transmission shaft to overrun the reduction gear system; a reverse gear system mounted on said countershaft and including a reverse gear rotating with said reduction gear and a pinion meshing with the reverse gear and engageable by said sliding gear; an engine braking system comprising a braking gear mounted on the countershaft and rotatable with said reduction gear, a gear idling on the main transmission shaft and meshing with said braking gear, and means engageable to affix said idling gear to the main transmission shaft; a speed responsive governor operably connected to the main transmission shaft and to said automatically operated clutch driven by the main transmission shaft and adapted to cause engagement of said automatically operated clutch at a predetermined speed of said main transmission shaft, means to render said governor ineffective when said sliding gear is in a neutral position and when said sliding gear is in engagement with the pinion of the reverse gear system and additional means to render said governor ineffective adapted to enable the hydraulically actuated clutch to be disengaged under conditions normally calling for direct drive.

9. A hydraulic transmission comprising an input shaft, a main transmission shaft, a hydraulically actuated clutch for coupling said input shaft to the main transmission shaft, an impeller driven by said input shaft, a runner driven by the impeller, a shaft carrying said runner, a reaction member mounted on a one way clutch to permit the reaction member to run forwards when torque conversion ceases, an input pinion, a release clutch coupling the runner shaft to said input pinion, a countershaft means for engaging and disengaging said release clutch, a reduction gear system comprising a reduction gear meshing with said input pinion, mounted on said countershaft and connected with a second gear mounted on the countershaft and, a sliding gear splined to the main transmission shaft and engageable with said second gear; a one way clutch connecting said second gear to the countershaft to permit the main transmission shaft to overrun the reduction gear system; a reverse gear system mounted on said countershaft and including a reverse gear rotating with said reduction gear, and a pinion meshing with the reverse gear and engageable by said sliding gear; an engine braking system comprising a braking gear mounted on the countershaft and rotatable with said reduction gear, a gear idling on the main transmission shaft and meshing with said braking gear, a dog clutch on said idling gear, a sliding collar mounted on a hub on the main transmission shaft and engageable with said dog clutch to affix said idling gear to the main transmission shaft; a speed responsive governor drivably connected to the main transmission shaft operably connected to said automatically operated clutch and adapted automatically to cause hydraulic fluid to be supplied to said hydraulically actuated clutch to engage said hydraulically actuated clutch at a predetermined speed of said main transmission shaft, means to render said governor ineffective when said sliding gear is in a neutral position and when said sliding gear is in engagement with the pinion of the reverse gear system and additional means to render said governor ineffective adapted to enable the hydraulically actuated clutch to be disengaged under conditions normally calling for direct drive.

10. In a hydraulic transmission, a fluid torque converter including an impeller driven by an input member and a runner drivably connected to an output member through a countershaft reduction gear system, a hydraulically actuated clutch engageable to couple said input member to said output member for direct drive, means for rendering said reduction gear system ineffective to drive said output member during direct drive, a solenoid operated valve for controlling the supply of hydraulic fluid to said clutch, a speed responsive governor acting to close an electric circuit energizing said solenoid to engage the clutch at a predetermined speed and switch means for opening said circuit to make the governor ineffective to operate the clutch.

11. In a hydraulic transmission, a fluid torque converter including an impeller driven by an input member and a runner drivably connected to a countershaft reduction gear system, means engageable to connect the output of said reduction gear system with an output member of the transmission, a reverse gear system drivably connected with said runner, said means engageable to connect the output of the reduction gear system being alternatively engageable with said reverse gear system and having a fully effective neutral position in engagement neither with the reduction gear system nor with the reverse gear system, means for rendering said reduction gear system ineffective to drive said output member during direct drive, a hydraulically actuated clutch engageable to couple said input member to said output member for direct drive, a solenoid operated valve for controlling the supply of hydraulic fluid to said clutch, a speed responsive governor acting to close an electric circuit energizing said solenoid to engage the clutch at a predetermined speed, switch means adapted to open said circuit when said means engageable to connect the output is in its neutral position and when the last mentioned means is in engagement with the reverse gear system, and additional switch means for independently opening said circuit to make the governor ineffective to operate the clutch.

12. A hydraulic transmission for use in a vehicle having an engine lubrication system providing for lubrication of the engine by oil under pressure comprising an impeller driven by an input member, and a runner drivably connected to an output member through a reduction gear system, a hydraulically actuated clutch engageable to couple said input member to said output member for direct drive, means for rendering said reduction gear system ineffective to drive said output member during direct drive, a solenoid operated valve for controlling the supply of oil under pressure from the engine lubrication system to said clutch, a modulator operating when said valve is opened to supply oil to said clutch, said modulator being adapted to cause oil to be supplied to said clutch at an initial low pressure continuously increasing to the pressure of the engine lubrication system, a speed responsive governor acting to close an electric circuit energizing said solenoid to engage the clutch at a predetermined speed.

13. A hydraulic transmission as in claim 12 in which said modulator is fed by an inlet disposed so as to be supplied with oil under pressure simultaneously with the admission through said valve of oil under pressure to said clutch, and in which said modulator includes a chamber supplied through said inlet, a piston within said chamber, and compression springs opposing movement of said piston to enlarge the oil containing portion of said chamber.

14. A hydraulic transmission for use in a vehicle having an engine lubricated by oil under pressure comprising a torque converter including an impeller, a reaction member and a runner, a reduction gearing system, an automatically controlled hydraulically actuated clutch for effecting a direct drive connection to replace said reduction gearing system, means for channelling lubricating oil under a reduced pressure less than the engine pressure to said torque converter, means for applying oil at said reduced pressure to said hydraulically actuated clutch to re-release said clutch and means for applying oil at full engine pressure to said hydraulically actuated clutch to engage said clutch.

15. A hydraulic transmission as in claim 7 comprising a throttle operably connected to the governor and in which the predetermined speed at which the governor acts is modulated by the throttle actuation.

References Cited in the file of this patent

UNITED STATES PATENTS

| | | |
|---|---|---|
| Re. 22,967 | Nutt et al. | Jan. 27, 1948 |
| 2,466,206 | Carnagua | Apr. 5, 1949 |
| 2,619,848 | Carnagua | Dec. 2, 1952 |
| 2,623,411 | Herndon | Dec. 30, 1952 |
| 2,627,189 | McFarland | Feb. 3, 1953 |
| 2,640,373 | Jandasek | June 2, 1953 |

FOREIGN PATENTS

| | | |
|---|---|---|
| 668,839 | France | July 22, 1929 |